(12) United States Patent
Kuo

(10) Patent No.: US 11,174,981 B2
(45) Date of Patent: Nov. 16, 2021

(54) SUPPORTING DEVICE

(71) Applicant: Oned Co., Ltd., Hualien County (TW)

(72) Inventor: Chih Ju Kuo, Hualien County (TW)

(73) Assignee: Oned Co., Ltd., Hualien County (TW)

( * ) Notice: Subject to any disclaimer, the term of this patent is extended or adjusted under 35 U.S.C. 154(b) by 0 days.

(21) Appl. No.: 17/001,343

(22) Filed: Aug. 24, 2020

(65) Prior Publication Data
US 2021/0207764 A1    Jul. 8, 2021

(30) Foreign Application Priority Data
Jan. 8, 2020   (TW) ............................ 109200284

(51) Int. Cl.
*F16M 11/38* (2006.01)
*F16M 11/20* (2006.01)
*F16M 11/24* (2006.01)
*F16M 13/02* (2006.01)

(52) U.S. Cl.
CPC ......... *F16M 11/38* (2013.01); *F16M 11/2021* (2013.01); *F16M 11/245* (2013.01); *F16M 13/022* (2013.01)

(58) Field of Classification Search
CPC combination set(s) only.
See application file for complete search history.

(56) References Cited

U.S. PATENT DOCUMENTS

| | | | | |
|---|---|---|---|---|
| 683,724 A * | 10/1901 | Carr | ............... | A47B 23/042 248/453 |
| 733,100 A * | 7/1903 | Werner | ............... | A47B 23/043 248/456 |
| 987,113 A * | 3/1911 | Cooley | ............... | A47B 27/02 108/10 |
| 1,840,620 A * | 1/1932 | Dennis | ............... | A47B 23/043 248/462 |
| 3,295,815 A * | 1/1967 | Howell | ............... | A47B 97/08 248/464 |
| 4,726,556 A * | 2/1988 | Weir | ............... | A47B 27/18 248/454 |
| 5,899,421 A * | 5/1999 | Silverman | ............... | F16M 11/38 248/175 |
| 5,915,661 A * | 6/1999 | Silverman | ............... | G06F 1/163 248/465.1 |

(Continued)

*Primary Examiner* — Monica E Millner
(74) *Attorney, Agent, or Firm* — Bradley J. Thorson; DeWitt LLP

(57) ABSTRACT

A supporting device includes a bottom seat with a first positioning member, a first supporting frame pivotally connected with the bottom seat, a second supporting frame, a third supporting frame pivotally connected with the first supporting frame and a fourth supporting frame to be coupled with a supported object. The second supporting frame is pivotally connected with the first supporting frame so as to change a height as a result of an angle of the first supporting frame relative to the bottom seat. The second supporting frame has a second positioning member to be coupled with the first positioning member in order to fix the first and second supporting frames. The fourth supporting frame is pivotally connected with the second and third supporting frame so that an angle and a height of the supported object are simultaneously changed with a pivoting motion of the first, second, third and fourth supporting frames.

6 Claims, 9 Drawing Sheets

(56) References Cited

U.S. PATENT DOCUMENTS

| | | | |
|---|---|---|---|
| 8,567,740 B2* | 10/2013 | Tarnutzer | B42D 9/00 |
| | | | 248/456 |
| 8,936,226 B2* | 1/2015 | Chang | A47B 19/00 |
| | | | 248/460 |
| 9,625,081 B2* | 4/2017 | Olander | F16M 11/10 |
| 10,070,719 B2* | 9/2018 | Olander | F16M 13/00 |
| 2013/0240704 A1* | 9/2013 | Andrews | F16M 11/00 |
| | | | 248/454 |
| 2018/0252353 A1* | 9/2018 | Hou | F16M 11/38 |

* cited by examiner

SUPPORTING DEVICE

BACKGROUND OF THE INVENTION

1. Technical Field

The present invention relates to a supporting frame and more particularly to a movable supporting frame capable of raising an object.

2. Description of Related Art

In recent years, it is popularly concerned about how to conveniently hold the mobile device and review information on the screen since the mobile device is developed gradually. Therefore, supporting devices for smartphones or tablets have been developed for users to watch the screen with an easy posture, avoiding from inconvenience and muscle ache caused by holding for a long time.

An angle of the screens of supporting devices, such as those disclosed in Taiwan Patent No. M581221 or Taiwan published application No. 201538880, can be adjusted through pivotally connected frames. These structures, however, can only change the angle of the screen rather than the height, not meeting the demand for usage.

Another supporting device, such as that disclosed in Taiwan Patent No. 1376947, includes a first frame and a second frame pivotally connected with each other. The first frame is connected with a screen while the second frame is connected with a bottom frame. Heights of the first frame and the screen are changed by pivoting the second frame, and an angle of the screen is changed by pivoting the first frame. In this structure, however, the angle and the height of the screen are separately adjusted rather than simultaneously adjusted.

One more supporting device, such as that disclosed in Taiwan Patent No. 1620493, includes a high seat with a rail in a semi-U shape. A screen fastener capable of being selectively positioned on the rail can move along the rail. Angle and height of the screen are changed as a result of the position of the screen fastener. This structure, however, is too big to be carried and to be stored, which is incompatible with the high mobility of mobile devices.

BRIEF SUMMARY OF THE INVENTION

The primary objective of the present invention is to provide a supporting device capable of changing an angle and a height of a supported object simultaneously for convenience of use.

To achieve the above objective, the present invention provides a supporting device comprising a bottom seat with a first positioning member, a first supporting frame, a second supporting frame with a second positioning member, a third supporting frame and a fourth supporting frame to be coupled with a supported object. The first supporting frame is pivotally connected with the bottom seat. The second supporting frame is intersected with the first supporting frame and is pivotally connected with the first supporting frame. The third supporting frame is pivotally connected with the first supporting frame. The fourth supporting frame is pivotally connected with the second supporting frame via a bottom end and is pivotally connected with the third supporting frame via a top end. A height of the second supporting frame is changed as a result of an angle of the first supporting frame relative to the bottom seat, and then the first and second supporting frames can be fixed by coupling the first and second positioning members. An angle and a height of the supported object are simultaneously changed with a pivoting motion of the first, second, third and fourth supporting frames.

Preferably, the fourth supporting frame is provided with a rotatable or fixed back board to be coupled with the supported object.

The first positioning member abovementioned includes a rack portion disposed on the bottom seat, a roof portion extending over the rack portion from the bottom seat; and an inserted space formed between the rack portion and the roof portion. The second positioning member abovementioned includes a block portion protruding from a bottom of the second supporting frame and a column portion disposed on the block portion. The block portion is selectively engaged with the rack portion while the column portion extends into the inserted space and is blocked by the roof portion.

In addition, the bottom seat has a room capable of accommodating the first, second, third and fourth supporting frames after being flattened.

In one embodiment, the second supporting frame includes a bottom frame portion and an upper frame portion pivotally connected with each other. The bottom frame portion is movably connected with the bottom seat. The upper frame portion is intersected with the first supporting frame and is pivotally connected with the first supporting frame and the fourth supporting frame. A height of the upper frame portion is changed as a result of the angle of the first supporting frame relative to the bottom seat, and then the bottom frame portion is simultaneously driven to move relative to the bottom seat. In addition, the second positioning member includes a rack portion disposed on the bottom frame portion while the first positioning member includes a button with a block portion selectively engaged with the rack portion and a spring. The spring abuts against the block portion with an end and abuts against the rack portion with an opposite end so as to normally push the block portion to engage with the rack portion.

The present invention provides another supporting device comprising a bottom seat with a first positioning member, a first supporting frame, a second supporting frame with a second positioning member and a third supporting frame. The first supporting frame is pivotally connected with the bottom seat. The second supporting frame is intersected with the first supporting frame and is pivotally connected with the first supporting frame. The second supporting frame is pivotally connected with a supported object. The third supporting frame is pivotally connected with the supported object and the first supporting frame. A height of the second supporting frame is changed as a result of an angle of the first supporting frame relative to the bottom seat, and then the first and second supporting frames can be fixed by coupling the first and second positioning members. An angle and a height of the supported object are simultaneously changed with a pivoting motion of the first, second and third supporting frames.

The first positioning member abovementioned includes a rack portion disposed on the bottom seat, a roof portion extending over the rack portion from the bottom seat; and an inserted space formed between the rack portion and the roof portion. The second positioning member abovementioned includes a block portion protruding from a bottom of the second supporting frame and a column portion disposed on the block portion. The block portion is selectively engaged with the rack portion while the column portion extends into the inserted space and is blocked by the roof portion.

In addition, the bottom seat has a room capable of accommodating the first, second, and third supporting frames and the supported object after being flattened.

DETAILED DESCRIPTION OF THE INVENTION

Figure 1:
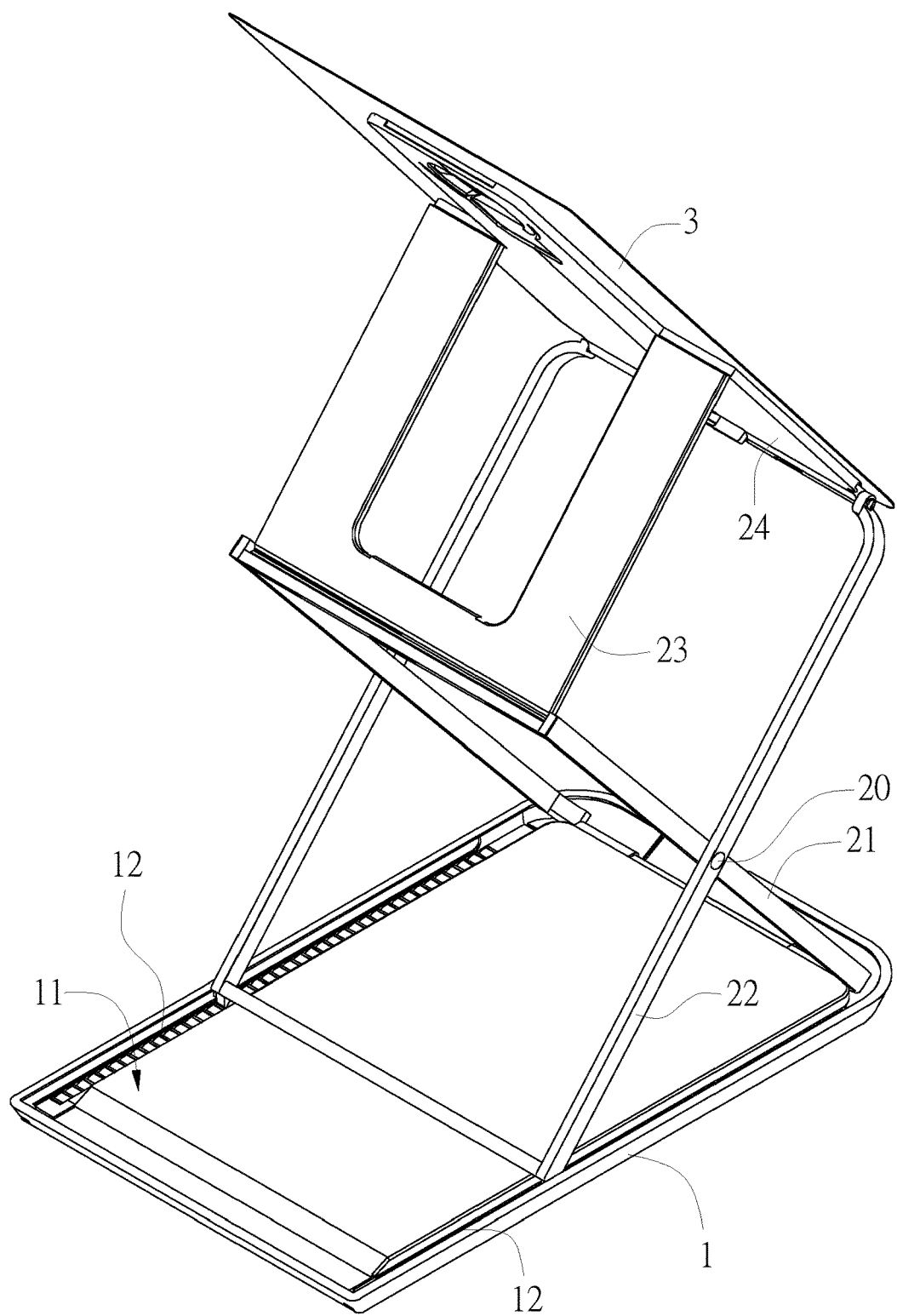
FIG. 1 is a perspective view of a first embodiment of the present invention.

Referring to FIG. 1, the supporting device according to a first embodiment of the present invention includes a bottom seat 1, a first supporting frame 21, a second supporting frame 22, a third supporting frame 23 and a fourth supporting frame 24. The bottom seat 1 is a box-like structure and has a room 11. A rack portion 12 is disposed on two opposite sides of the bottom seat 1.

Figure 2:
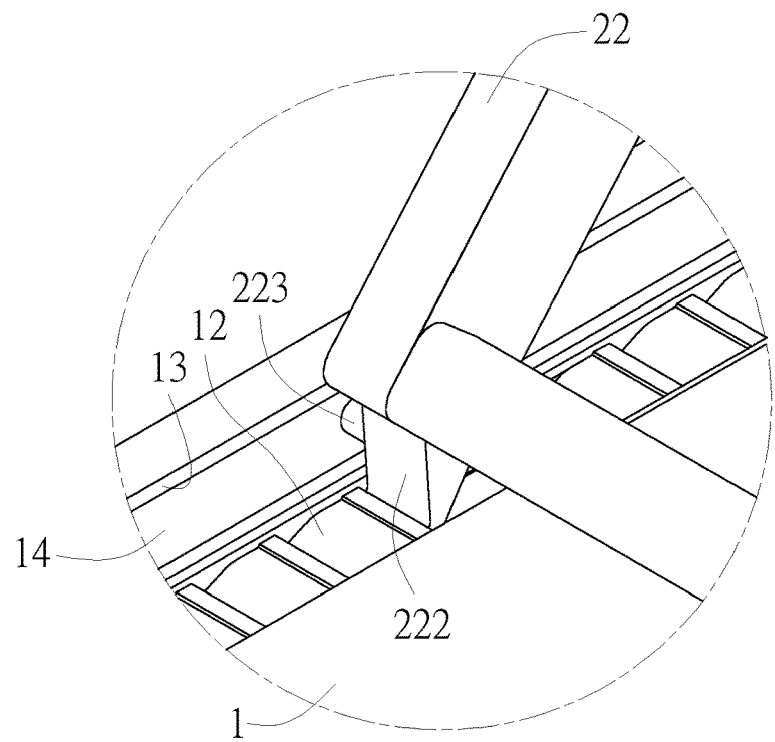
FIG. 2 is an enlarged view showing a part of the embodiment in FIG. 1.

Both of the first supporting frame 21 and the second supporting frame 22 are formed as rectangular frames. A bottom end of the first supporting frame 21 is pivotally connected to the bottom seat 1. The second supporting frame 22 is intersected with the first supporting frame 21 and is pivotally connected with the first supporting frame 21 via a shaft 20. As shown in FIG. 2, a block portion 222 capable of being selectively engaged with the rack portion 12 protrudes from a bottom of the second supporting frame 22. A column portion 223 extends laterally from the block portion 222. A roof portion 13 is disposed over the rack portion 12 on the bottom seat 1. An inserted space 14 is formed between the rack portion 12 and the roof portion 13 for the column portion 223 inserting into. According to this, the second supporting frame 22 is positioned with the block portion 222 being engaged with the rack portion 12. When the second supporting frame 22 is pulled by the first supporting frame 21 that pivots relative to the bottom seat 1, the block portion 222 leaves the rack portion 12 so that the second supporting frame 22 moves. At this time, the second supporting frame 22 does not leave the bottom seat 1 since the column portion 223 is blocked by the roof portion 13, avoiding the whole structure from being knocked over.

Figure 4:
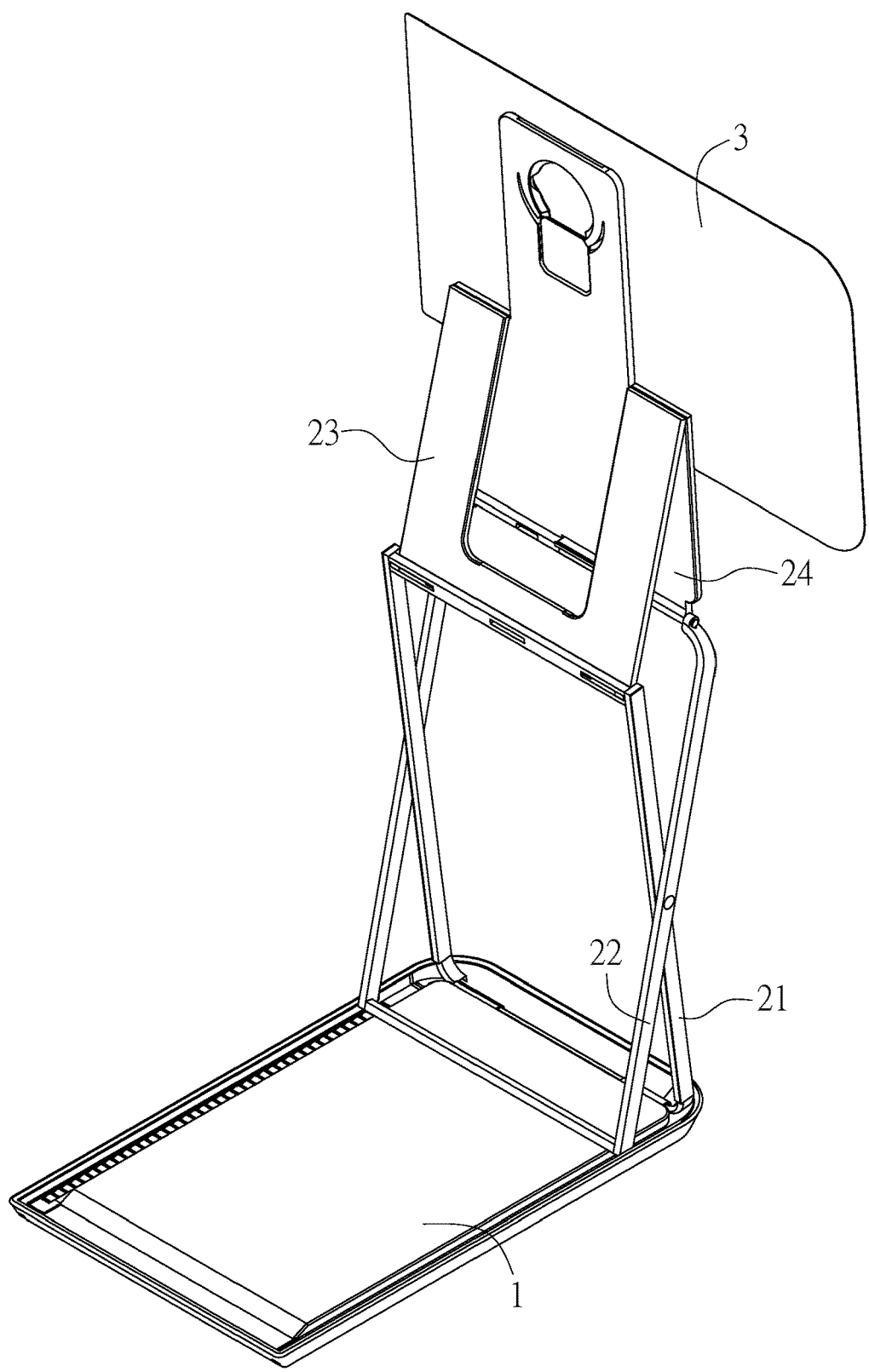
FIG. 4 is a perspective view showing a rotation to a back board of the embodiment in FIG. 1.

A bottom end of the third supporting frame 23 is pivotally connected with a top end of the first supporting frame 21. A bottom end of the fourth supporting frame 24 is pivotally connected with a top end of the second supporting frame 22. A top end of the third supporting frame 23 is pivotally connected with a top end of the fourth supporting frame 24. A rotatable or fixed back board to be coupled with a supported object such as a mobile device, not shown in the Figure, is connected with the fourth supporting frame 24. Referring to FIG. 4, if a rotatable back board 3 is chosen, the mobile device may be turned for convenient use.

As a four-bar linkage mechanism consisting of the first supporting frame 21, the second supporting frame 22, the third supporting frame 23, the fourth supporting frame 24 and the back board 3 is built, the first supporting frame 21, the second supporting frame 22 and the third supporting frame 23 will pivot with each other together and move to positions which support the fourth supporting frame 24 firmly if the fourth supporting frame 24 as well as the back board 3 moves.

Figure 3:
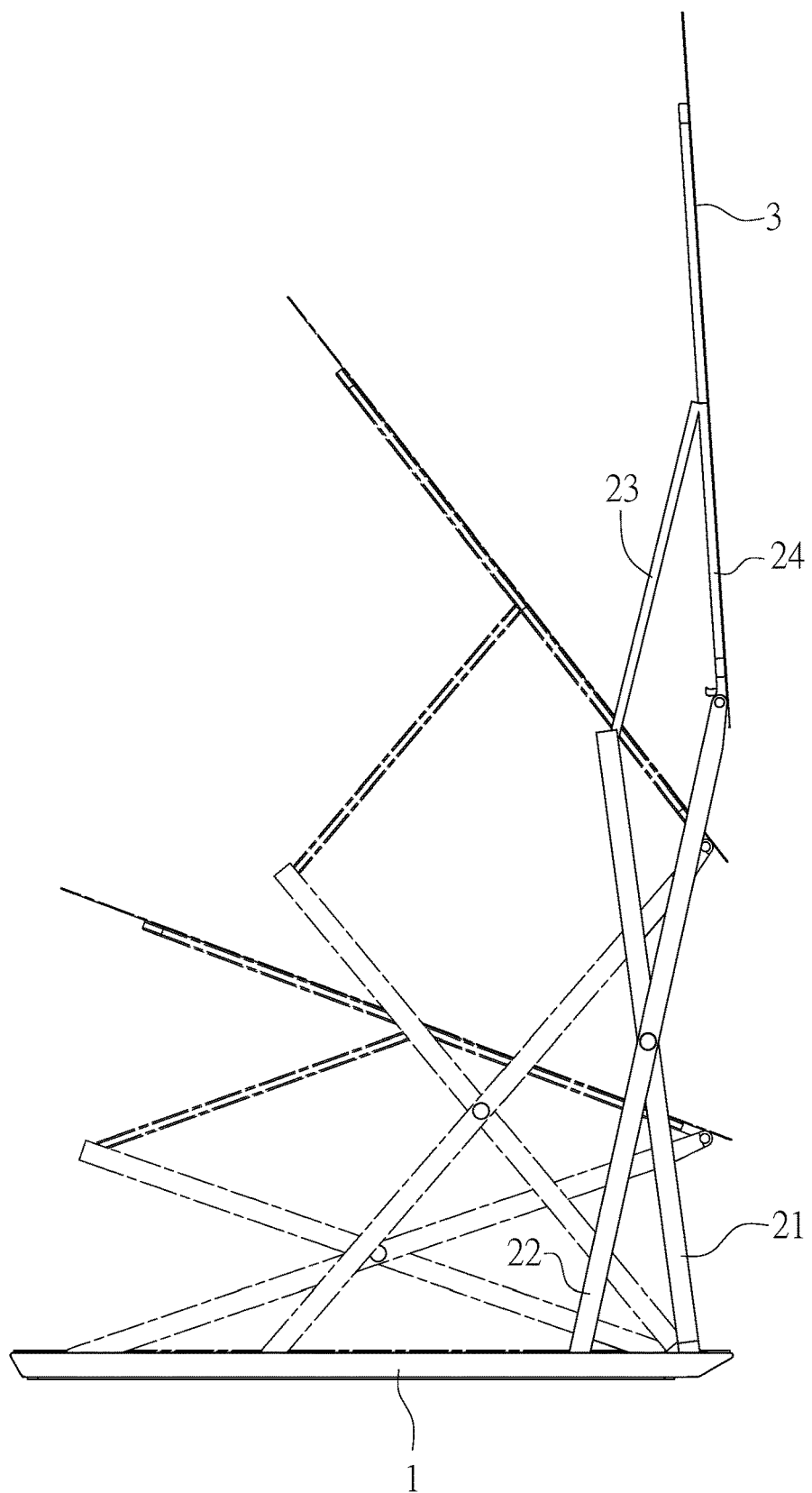
FIG. 3 is a plan view showing how the embodiment in FIG. 1 changes in the angle and height.

Furthermore, an angle and a height of the mobile device are changed simultaneously with movement done by the four-bar linkage mechanism abovementioned in order to simplify the adjustment and save time. Referring to FIG. 3, the angle of the mobile device increases, or the mobile device stands up to the vertical, in course of pulling the back board 3 upward to a high position. On the contrary, the angle of the mobile device decreases, or the mobile device lies down to the horizontal, in course of pushing the back board 3 downward to a low position.

Figure 5:
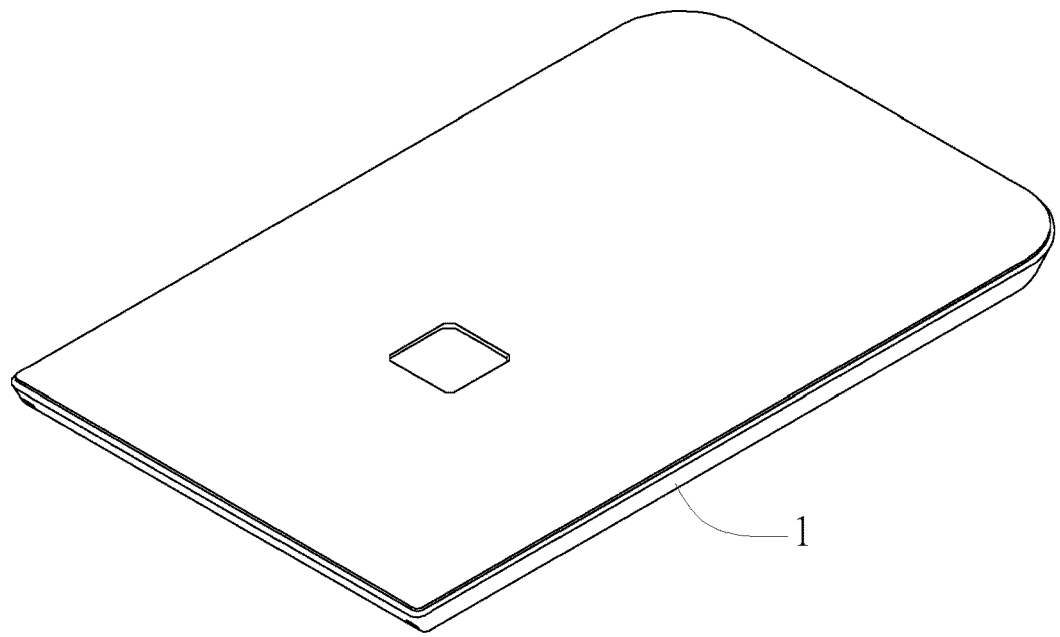
FIG. 5 is a perspective view showing that the embodiment in FIG. 1 is in a storage situation.

As shown in FIG. 5, when the first supporting frame 21, the second supporting frame 22, the third supporting frame 23, the fourth supporting frame 24 and the back board 3 are flattened, they are accommodated in the room of the bottom seat 1 so as to reduce the size for easy storage and portability.

Figure 6:
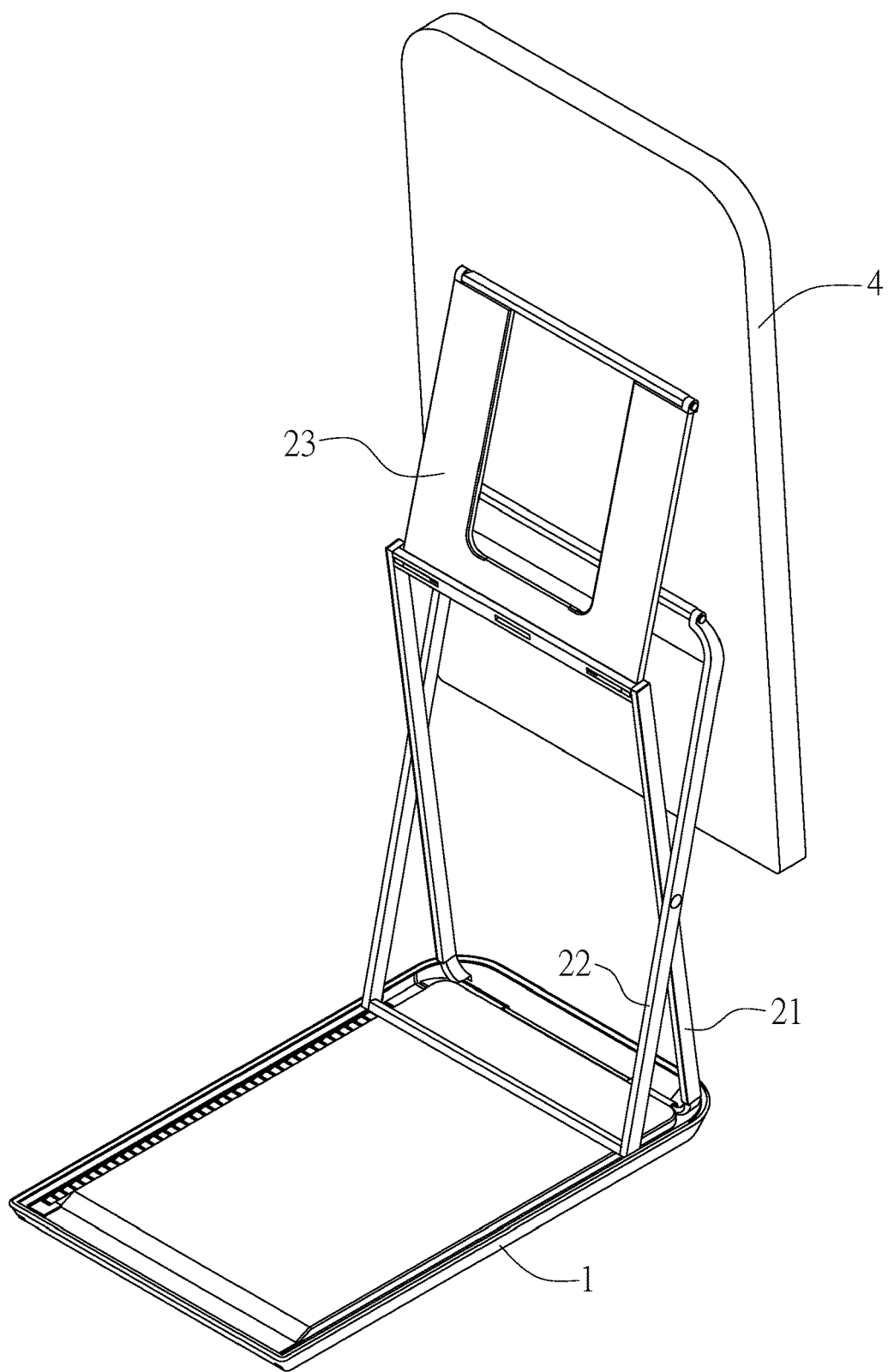
FIG. 6 is a perspective view of a second embodiment of the present invention.

The supporting device according to a second embodiment of the present invention is shown in FIG. 6. Compared to the previous embodiment, the fourth supporting frame is omitted. In this embodiment, a top end of the second supporting frame 22 and a top end of the third supporting frame 23 are pivotally connected with the supported object 4 separately. The first supporting frame 21, the second supporting frame 22, the third supporting frame 23 and the supported object 4 cooperate to form a four-bar linkage mechanism so that an angle and a height of the supported object 4 are changed simultaneously in order to simplify the adjustment and save time.

Similarly, when the first supporting frame 21, the second supporting frame 22, the third supporting frame 23 and the supported object 4 are flattened, they are accommodated in the room of the bottom seat 1 so as to reduce the size for easy storage and portability.

Figure 7:
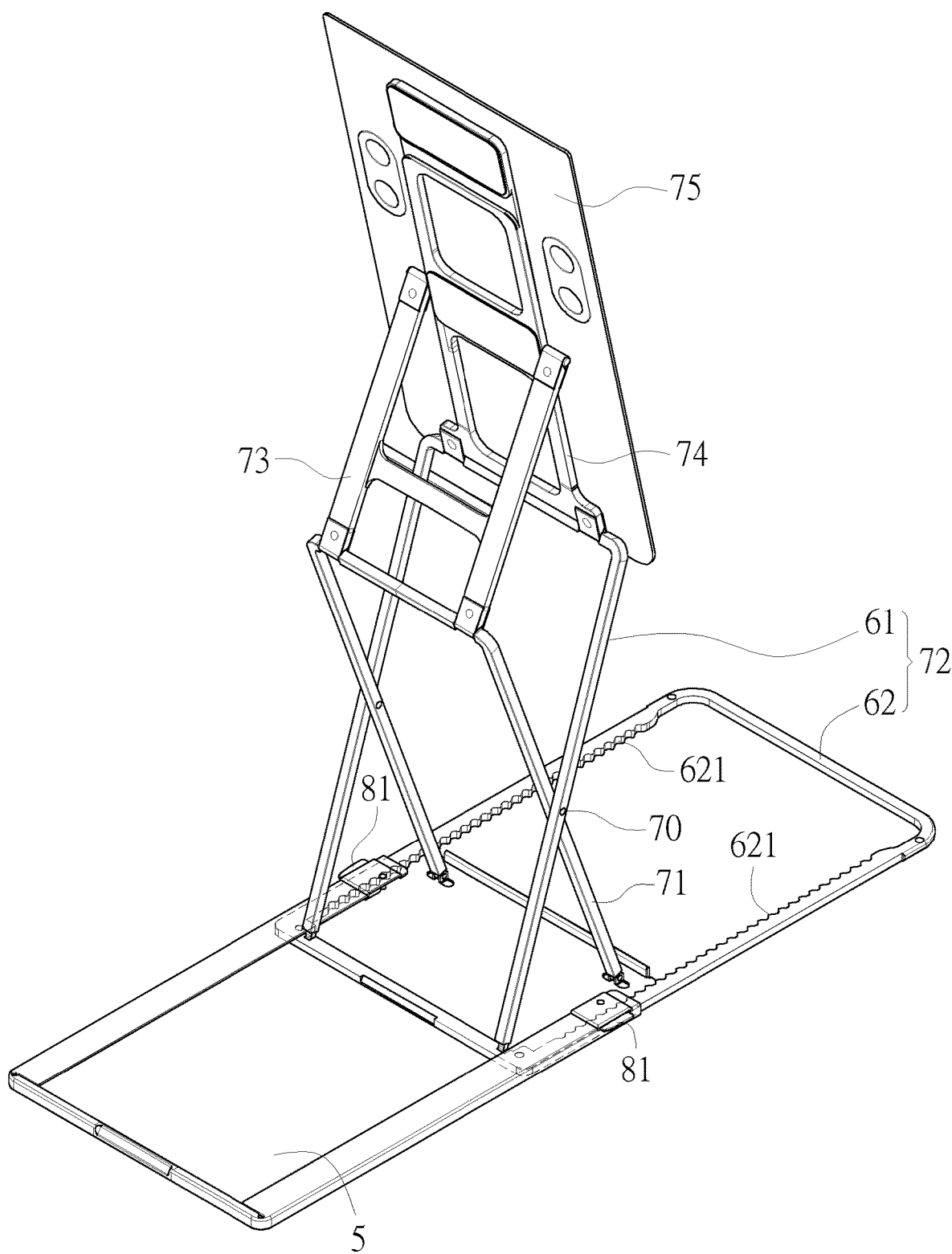
FIG. 7 is a perspective view of a third embodiment of the present invention.

Referring to FIG. 7, the supporting device according to a third embodiment of the present invention includes a hollow bottom seat 5, a first supporting frame 71, a second supporting frame 72, a third supporting frame 73 and a fourth supporting frame 74. A bottom end of the first supporting frame 71 is pivotally connected to the bottom seat 5. The second supporting frame 72 includes an upper frame portion 61 and a bottom frame portion 62 pivotally connected with each other. The upper frame portion 61 is intersected with the first supporting frame 71 and is pivotally connected with the first supporting frame 71 via a shaft 70. The bottom frame portion 62 is movably received in the bottom seat 5. A height of the upper frame portion 61 is changed as a result of an angle of the first supporting frame 71 relative to the bottom seat 5, and thus the bottom frame portion 62 is driven to move relative to the bottom seat 5 in the meanwhile.

A bottom end of the third supporting frame 73 is pivotally connected with a top end of the first supporting frame 71. A bottom end of the fourth supporting frame 74 is pivotally connected with a top end of the upper frame portion 61. A top end of the third supporting frame 73 is pivotally connected with a top end of the fourth supporting frame 74. A rotatable or fixed back board 75 to be coupled with a supported object such as a mobile device, not shown in the Figure, is connected with the fourth supporting frame 24.

Figure 8:
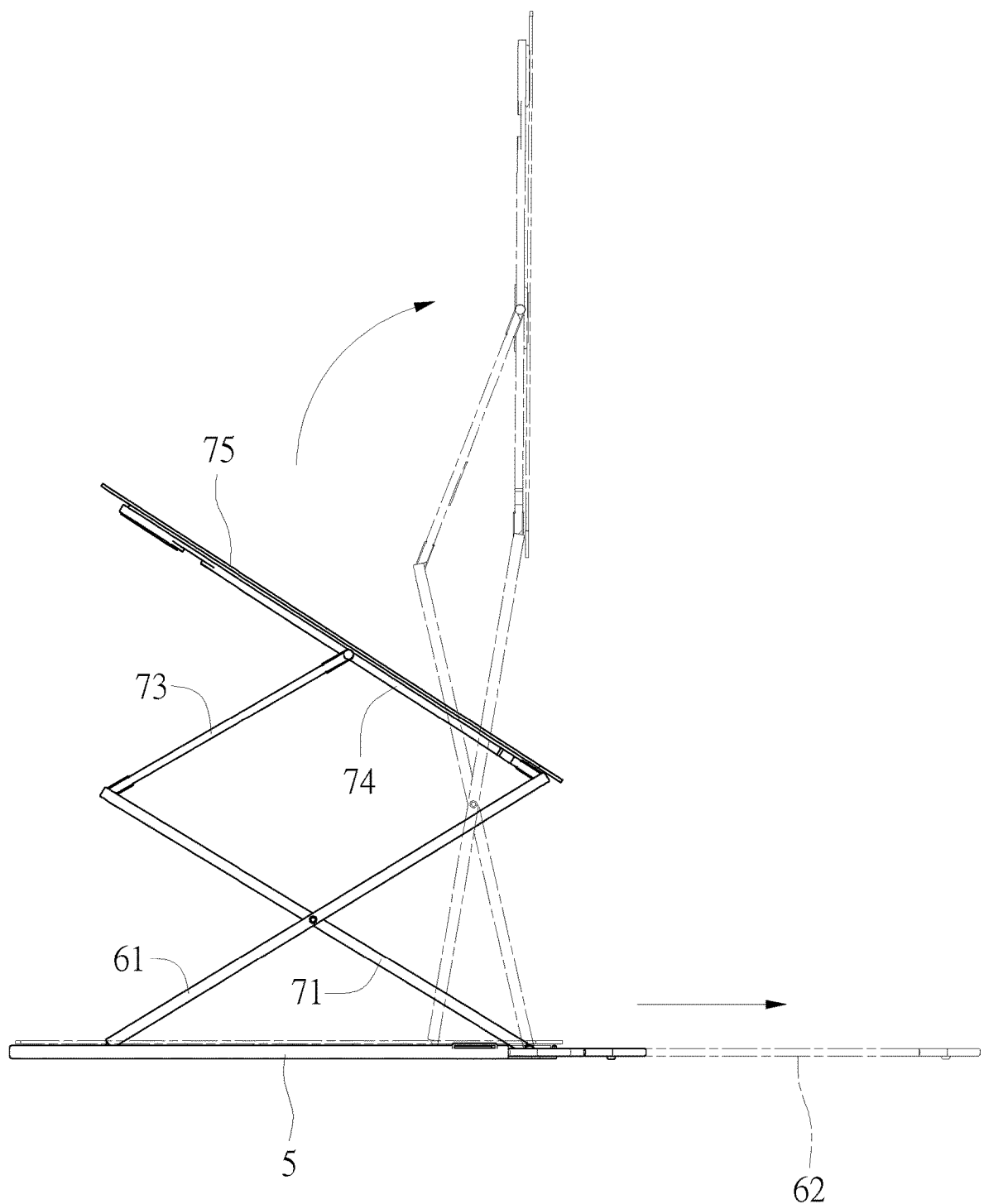
FIG. 8 is a perspective view showing how the embodiment in FIG. 7 acts when in use.

As a four-bar linkage mechanism consisting of the first supporting frame 71, the upper frame portion 61, the third supporting frame 73, the fourth supporting frame 74 and the back board 75 is built, the first supporting frame 71, the upper frame portion 61 and the third supporting frame 73 will pivot with each other together and move to positions which support the fourth supporting frame 74 firmly if the fourth supporting frame 74 as well as the back board 75 moves. In addition, the bottom frame portion 62, as shown in FIG. 8, is pulled out of the bottom seat 5 by the upper frame portion 61 in course of pulling the back board 75 upward to a high position. Therefore, contacting area of the supporting device with the ground is expanded to support the supported object more stably.

Figure 9:
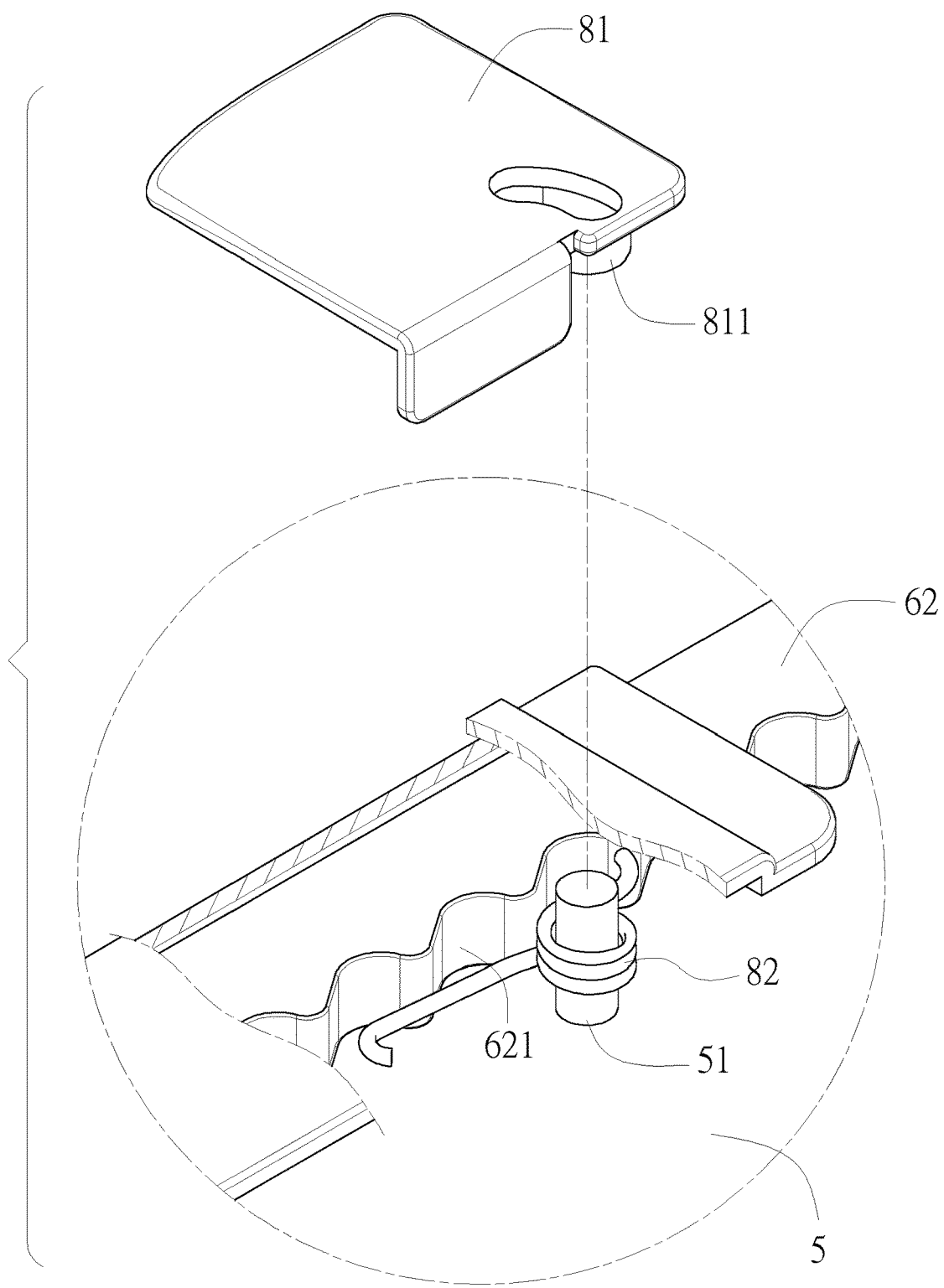
FIG. 9 and FIG. 10 are enlarged views showing a positioning structure of the embodiment in FIG. 7.
Figure 10:
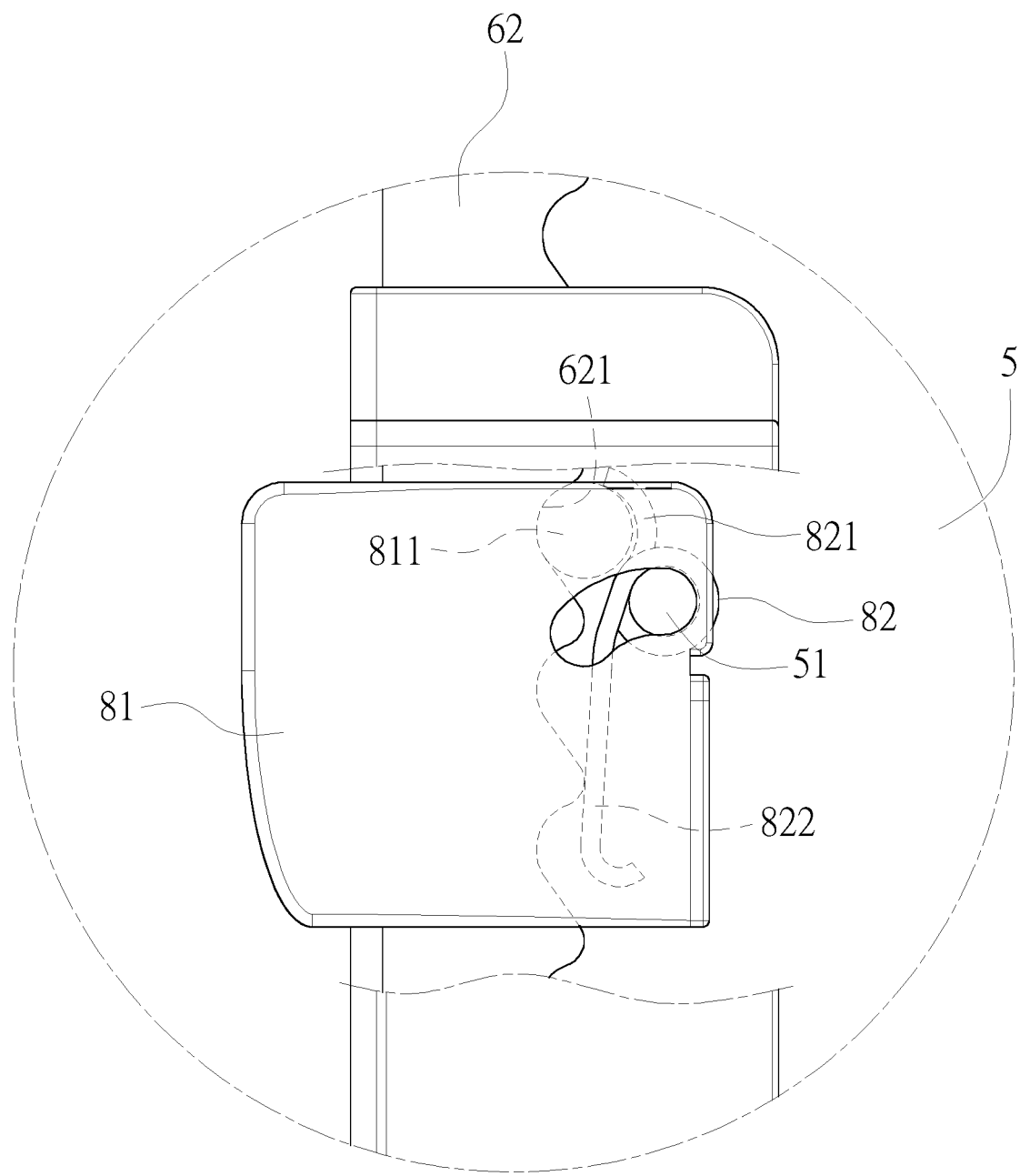

The supported object may be positioned after its angle and height are determined. Referring to FIGS. 7, 9 and 10, the bottom frame portion 62 is provided with a rack portion 621 while the bottom seat 5 is provided with a button 81 and a spring 82. A block portion 811 is disposed on the button 81. The spring 82 is positioned on a pole 51 located on the bottom seat 5 with an end 821 abutting against the block portion 811 and an opposite end abutting against the rack portion 621 so that the spring 82 normally pushes the block portion 811 to engage with the rack portion 621 in order to fix the first supporting frame 71 and the second supporting frame 72, hence the supported object is locked.

The supported object is unlocked for adjustment to angle and height by pressing the button 81 to make the block portion 811 leave the rack portion 621 for the bottom frame portion 62 moving along the bottom seat 5 with the upper frame portion 61.

What is claimed is:

1. A supporting device comprising:
   a bottom seat with a first positioning member;
   a first supporting frame pivotally connected with the bottom seat;
   a second supporting frame intersected with the first supporting frame, wherein the second supporting frame is pivotally connected with the first supporting frame so as to change a height of the second supporting frame as a result of an angle of the first supporting frame relative to the bottom seat, wherein the second supporting frame is provided with a second positioning member configured to be coupled with the first positioning member in order to fix the first supporting frame and the second supporting frame;
   a third supporting frame pivotally connected with the first supporting frame; and
   a fourth supporting frame with a bottom end pivotally connected with the second supporting frame and a top end pivotally connected with the third supporting frame, configured to be coupled with a supported object;
   wherein the second supporting frame includes:
   a bottom frame portion movably connected with the bottom seat; and
   an upper frame portion intersected with the first supporting frame, the upper frame portion being pivotally connected with the bottom frame portion, the upper frame portion being pivotally connected with the first supporting frame and the fourth supporting frame so as to change a height of the upper frame portion as a result of the angle of the first supporting frame relative to the bottom seat and simultaneously drive the bottom frame portion to move relative to the bottom seat;
   wherein the second positioning member includes a rack portion disposed on the bottom frame portion;
   wherein the first positioning member includes:
   a button with a block portion selectively engaged with the rack portion; and
   a spring with an end abutting against the block portion and an opposite end abutting against the rack portion, the spring normally pushing the block portion to engage with the rack portion so that the first supporting frame and the second supporting frame are fixed;
   wherein an angle and a height of the supported object are simultaneously changed with a pivoting motion of the first, second, third and fourth supporting frames.

2. The supporting device of claim 1, wherein the fourth supporting frame is provided with a rotatable or fixed back board to be coupled with the supported object.

3. The supporting device of claim 1, wherein the first positioning member includes:
   a rack portion disposed on the bottom seat;
   a roof portion extending over the rack portion from the bottom seat; and
   an inserted space formed between the rack portion and the roof portion;
   the second positioning member includes:
   a block portion protruding from a bottom of the second supporting frame, the block portion being selectively engaged with the rack portion; and
   a column portion disposed on the block portion, the column portion extending into the inserted space and being blocked by the roof portion.

4. The supporting device of claim 3, wherein the bottom seat has a room accommodating the first, second, third and fourth supporting frames after being flattened.

5. A supporting device comprising:
   a bottom seat with a first positioning member, the first positioning member including a rack portion disposed on the bottom seat, a roof portion extending over the rack portion from the bottom seat and an inserted space formed between the rack portion and the roof portion;
   a first supporting frame pivotally connected with the bottom seat;
   a second supporting frame intersected with the first supporting frame, wherein the second supporting frame is pivotally connected with a supported object and is pivotally connected with the first supporting frame so as to change a height of the second supporting frame as a result of an angle of the first supporting frame relative to the bottom seat, wherein the second supporting frame is provided with a second positioning member, the second positioning member including a block portion protruding from a bottom of the second supporting frame, the block portion being selectively engaged with the rack portion, and a column portion disposed on the block portion, the column portion extending into the inserted space and being blocked by the roof portion; and
   a third supporting frame pivotally connected with the supported object and the first supporting frame;
   wherein an angle and a height of the supported object are simultaneously changed with a pivoting motion of the first, second and third supporting frames.

6. The supporting device of claim 5, wherein the bottom seat has a room accommodating the first, second, and third supporting frames and the supported object after being flattened.

* * * * *